United States Patent [19]
Williams

[11] Patent Number: 5,223,953
[45] Date of Patent: Jun. 29, 1993

[54] SCREENING CIRCUIT FOR VARIABLE ANGLE SCREENING OF IMAGE PIXELS

[75] Inventor: Leon C. Williams, Walworth, N.Y.

[73] Assignee: Xerox Corporation, Stamford, Conn.

[21] Appl. No.: 719,447

[22] Filed: Jun. 24, 1991

[51] Int. Cl.$^5$ .............................................. H04N 1/40
[52] U.S. Cl. ..................................... 358/456; 358/298; 358/459
[58] Field of Search ............... 358/455, 456, 457, 458, 358/459, 460, 429, 298

[56] References Cited

U.S. PATENT DOCUMENTS

| | | | |
|---|---|---|---|
| 3,900,834 | 8/1975 | Casey et al. | 340/172.5 |
| 4,149,194 | 4/1979 | Holladay | 358/283 |
| 4,185,304 | 1/1980 | Holladay | 358/459 |
| 4,419,662 | 12/1983 | Puskas et al. | 340/750 |
| 4,755,813 | 7/1988 | Williams | 340/799 |
| 4,916,551 | 4/1990 | Lin et al. | 358/483 |
| 5,124,803 | 6/1992 | Troxel | 358/298 |
| 5,172,248 | 12/1992 | Urabe et al. | 358/455 |

Primary Examiner—Edward L. Coles, Sr.
Assistant Examiner—Kinfe-Michael Negash
Attorney, Agent, or Firm—Mark Costello

[57] ABSTRACT

A programmable variable screening circuit with memory for storing at each address location both a pixel screen value and the memory address of the screen value for the next pixel to be screened, and a control including a latch pair for separating data from each memory location addressed into a screen value for screening the pixel and an address for addressing the memory location for the next screen value.

3 Claims, 7 Drawing Sheets

RECTANGLE ADDRESS = 0
SCREEN ELEMENTS = 15
(-) OFFSET STEP SIZE = -4
FAST SCAN REPEAT - 1 = 5 - 1
PAGE OFFSET = 5 - 1

| 4 | 3 | 2 | 1 | 0 | 4 | 3 | 2 | 1 | 0 |
|---|---|---|---|---|---|---|---|---|---|
| 9 | 8 | 7 | 6 | 5 | 9 | 8 | 7 | 6 | 5 |
| 14 | 13 | 12 | 11 | 10 | 14 | 13 | 12 | 11 | 10 |
| 0 | 4 | 3 | 2 | 1 | 0 | 4 | 3 | 2 | 1 |
| 5 | 9 | 8 | 7 | 6 | 5 | 9 | 8 | 7 | 6 |
| 10 | 14 | 13 | 12 | 11 | 10 | 14 | 13 | 12 | 11 |
| 1 | 0 | 4 | 3 | 2 | 1 | 0 | 4 | 3 | 2 |
| 6 | 5 | 9 | 8 | 7 | 6 | 5 | 9 | 8 | 7 |
| 11 | 10 | 14 | 13 | 12 | 11 | 10 | 14 | 13 | 12 |

SCREENING CIRCUIT FOR VARIABLE ANGLE SCREENING OF IMAGE PIXELS

This invention relates to electronic screening of image signals or pixels, and more particularly, to an improved variable angle screening circuit for screening image signals or pixels.

INCORPORATION BY REFERENCE

U.S. Pat. No. 4,149,194 to Holladay and U.S. Pat. No. 4,755,813 to Williams are specifically incorporated by reference for their teachings.

BACKGROUND OF THE INVENTION

In current electronic printing systems when an original document such as a continuous tone photograph is scanned, digitized, and printed out by a high contrast printer, it is necessary to convert the continuous tone image into a bi-level or binary image by forming halftone cells whose size varies with the intensity of the original continuous tone image. This process is called halftoning or screening. However, the topology and characteristics of the halftone cells that comprise the screen that are used to convert the continuous tone image into a bi-level image affects the appearance of the final image. Further, selection of an appropriate screen for this purpose depends on the image original, the scanner, and the printer characteristics. Because of these variables, it is desirable to have a circuit that is flexible enough to generate screens of various topologies and characteristics.

Figure 1:
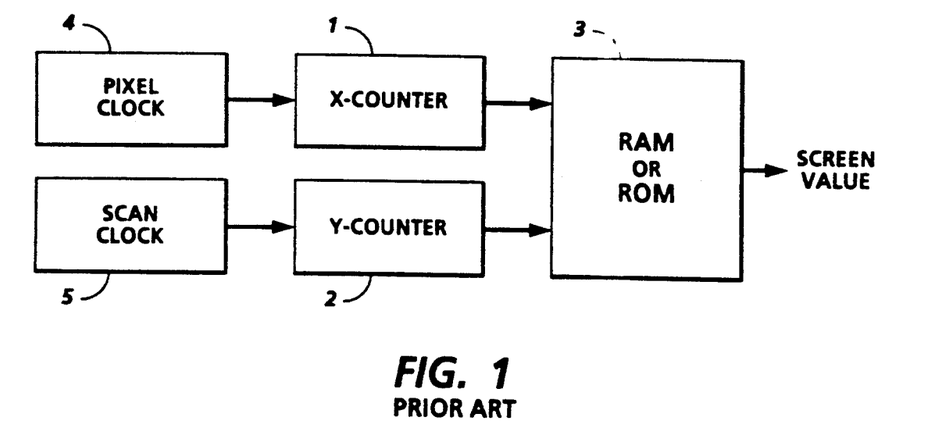
FIG. 1 shows a prior art rectangular coordinate screening circuit.

In FIG. 1, a typical prior art screening circuit is shown. To generate a repetitive screen pattern, two counters 1 and 2, one counter for the row (X), the other for the column (Y), are used to index into a preprogrammed table 3 to sequentially access screen values. For each pixel, a pixel clock 4 increments X counter 1 to sequentially access the next location of the screen table 3. At some point in the sequence, X counter 1 will roll-over to zero and the sequence in that row of screen table 3 will be repeated. X counter 1 continues to roll-over until the end of one raster on the image is reached. At this point, scan clock 5 increments Y counter 2 to access the next row of the screen table. Within this row, X counter 1 sequential addresses the screen values as it did in the previous row. Row after row of screen table 3 is output until eventually the Y counter roll-over occurs. This starts the screen sequence from the beginning and the whole process is repeated for the entire image. In this design approach, if the X and Y roll-over counts are to be programmable, additional hardware will be required to reset them at the programmed count. In this approach the halftone cell must always be rectangular.

Variable angle screening, as described in U.S. Pat. No. 4,149,194 to Holladay suggests generation of a variable angle halftone pattern using a modified rectangular halftone pattern, with the introduction of a shift parameter. This screening method produces a desirable appearance, that the present invention seeks to duplicate with a hardware implementation. U.S. Pat. No. 3,900,834 to Casey et al discloses a system designed to accommodate the situation where data on a common subject is stored at different locations within a memory, with no predetermined relation between the various memory locations. When it is desired to update the data, a controller sends the update messages to a common address table containing the address of the entry to be updated, and a chain address for another entry in the table where additional data on the same subject is stored. In U.S. Pat. No. 4,419,662 to Puskas et al, a character generator is disclosed in which display data stored in a memory is addressed to a video display by means of an output latch providing latched outputs to the video display.

SUMMARY OF THE INVENTION

In accordance with the invention, there is provided a hardware arrangement for efficiently enabling variable angle screening.

In accordance with one aspect of the invention, screen element address generation is broken into two pieces, the sequencing of screen element addresses within a scan line and the calculation of the fast scan offset (starting address at the beginning of a scan line). The address generation within a scan line must be performed at the video rate and is implemented using a hardware counter. This implies that the screen element values for the width of the rectangle must be located sequentially within the screen memory. For efficient hardware implementation of a modulo counter, a down counter is used. When the count value reaches zero, the counter is sequentially reloaded with the fast scan repeat parameter minus one. This implements a count that is modulo fast scan repeat. Using a down counter requires that the screen values loaded in the screen memory across the width of the rectangular cell be loaded in descending order. The calculation of the fast scan offset is only required between scan lines. To determine the new fast scan offset value, for each row of the rectangular cell (of height slow scan repeat) the same fast scan offset is used as in the preceding row. After the last row has been processed, add the offset step size parameters to the fast scan offset modulo fast scan repeat to generate a new fast scan offset value.

The proposed concept requires only a single counter to implement the screen address sequencing and updates this counter's starting value at the beginning of each new scanline. The advantage of a single counter is an efficient hardware implementation suitable for high-speed electronic reprographics. The size of the rectangular cell is specified by a Fast Scan Repeat parameter which is the width of the rectangular cell, and a Screen Element parameter which is the product of the width and height of the rectangular cell. The Slow Scan Repeat parameter, or the height of the cell, is computable from these two values. The Shift parameter is referred to as the Offset Step Size. For multi-channel image processing architectures, as shown in U.S. Pat. No. 4,916,551 to Lin et al, an additional Page Offset parameter is used to initialize the starting fast scan offset within the rectangular cell so that parallel image processing channels implement the same screen without discontinuity. This circuit generates addresses which are used to look up the screen values from a linear array of memory (RAM). Since multiple screen rectangles can be co-located in the same linear memory array, a Rectangle Address parameter is used to store the starting location of the rectangle in the memory array.

In accordance with another aspect of the invention, there is provided a screening arrangement for applying a variable angle halftone screen pattern to image data, including plural scan lines each having plurality of pixels, including screen address generation means for generating addresses corresponding to a first set of screen values of the screen pattern stored in a memory, to be applied to the image data, said screen address generation means including:

a page offset register loaded with the value representing the address in the screen of the first element in an image;

a fast scan offset register, loaded initially for each image with the values stored at the page offset register, and thereafter at the end of each scan line with an offset value representing the amount of distance, in pixels, by which the start of the next scan line is offset from the previous scan line;

a fast scan repeat register loaded with a value representing the width in pixels of the screen, minus 1;

a base register, initially set to a reference value, and updated at the end of each scan line in accordance with the value in the fast scan repeat register, plus 1;

a base address comparator, comparing said updated base register value compared with a value representing the number of pixel addresses in the screen pattern, to determine whether to reset the fast scan offset register to zero;

a single fast scan counter, counting from a value loaded therein to zero, the value loaded therein at the beginning of a scan line value from the fast scan offset register, and the value loaded thereinafter from the fast scan repeat register;

a fast scan counter adder, adding the values of the fast scan counter, and the values of the the base address, to produce as an output the screen addresses for each repetition of the screen pattern.

BRIEF DESCRIPTION OF THE DRAWINGS

These and other aspects of the invention will become apparent from the following description used to illustrate a preferred embodiment of the invention read in conjunction with the accompanying drawings in which.

PREFERRED EMBODIMENTS OF THE INVENTION

Digital image information in the form of image data picture elements, (hereinafter, pixels), digital voltage representations of image intensity at discrete locations in an image, is provided from a suitable source. For example, the image data pixels may be obtained through line by line scanning (thereby deriving scan lines of pixels) of an image bearing original by one or more photosensitive imaging devices, such as an array of photosites. Image data or pixels constitute the response of photosites indicating the intensity of light detected at the photosites over a given period. Line by line scanning of an image bearing original for the derivation of image information (image data or pixels) is well known and does not form a part of the present invention.

Figure 2:
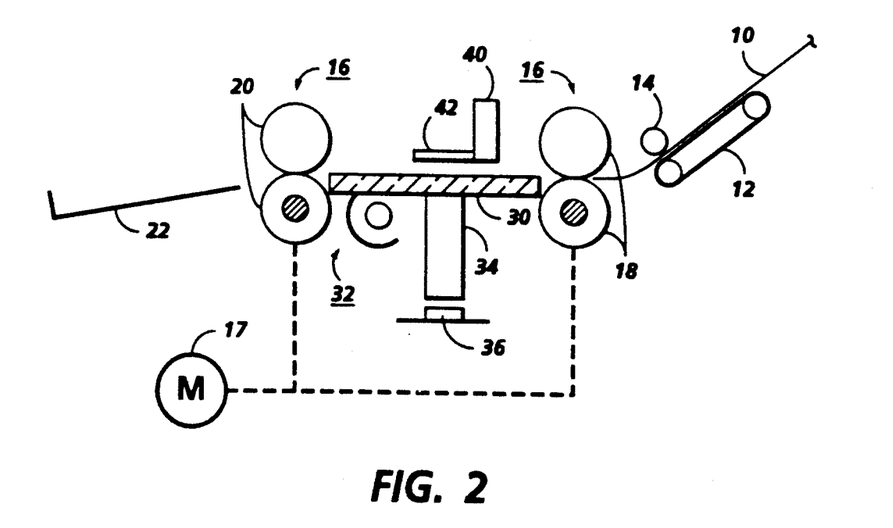
FIG. 2 demonstrates a somewhat schematic diagram of an image scanner possibly incorporating the present invention.

With reference now to the drawings where the showings are for the purpose of illustrating a preferred embodiment of the invention and not for limiting same, in an application incorporating the present invention, FIG. 2 shows one possible embodiment of a line by line image scanning device. Input tray 10 supports documents for feeding to an image position, via center retard belt feeder 12 and corresponding nip roll 14. Documents to be scanned are directed to a constant velocity transport (CVT) 16, driven by motor 17 drivingly connected thereto via pulley drives (not shown), for transports of sheets across a scanning position. Documents are initially engaged by CVT 16, at a first set of rolls 18, which drive the sheet across an imaging position to a second set of rolls 20, which engage the documents until they are ejected into an output tray 22.

An imaging position is defined by an imaging platen 30, which supports documents during the imaging process, an illuminator 32 typically comprising a lamp and reflector, a set of mirrors and an optical reducing lens 34 (shown schematically), which directs light from illuminator 32 reflected from a document being scanned to a sensor array 36, in this case a CCD array of sensors. A start of scan detector (or registration detector) 40 signals the system when a lead edge of a document is entering the imaging position, and a white calibration strip 42 is provided at a position for imaging by sensor array 36, when a document is not interposed between the sensor array and calibration strip 42. While the described arrangement moves original bearing images past a fixed array (a moving document scanning arrangement), stationary document scanning arrangements are known. Additionally, while the described arrangement is primarily applicable to paper documents, scanning arrangements scanning nonpaper originals such as slides, aperture cards or other image bearing originals are known. The present invention has application to all such scanning arrangements.

Figure 3A:
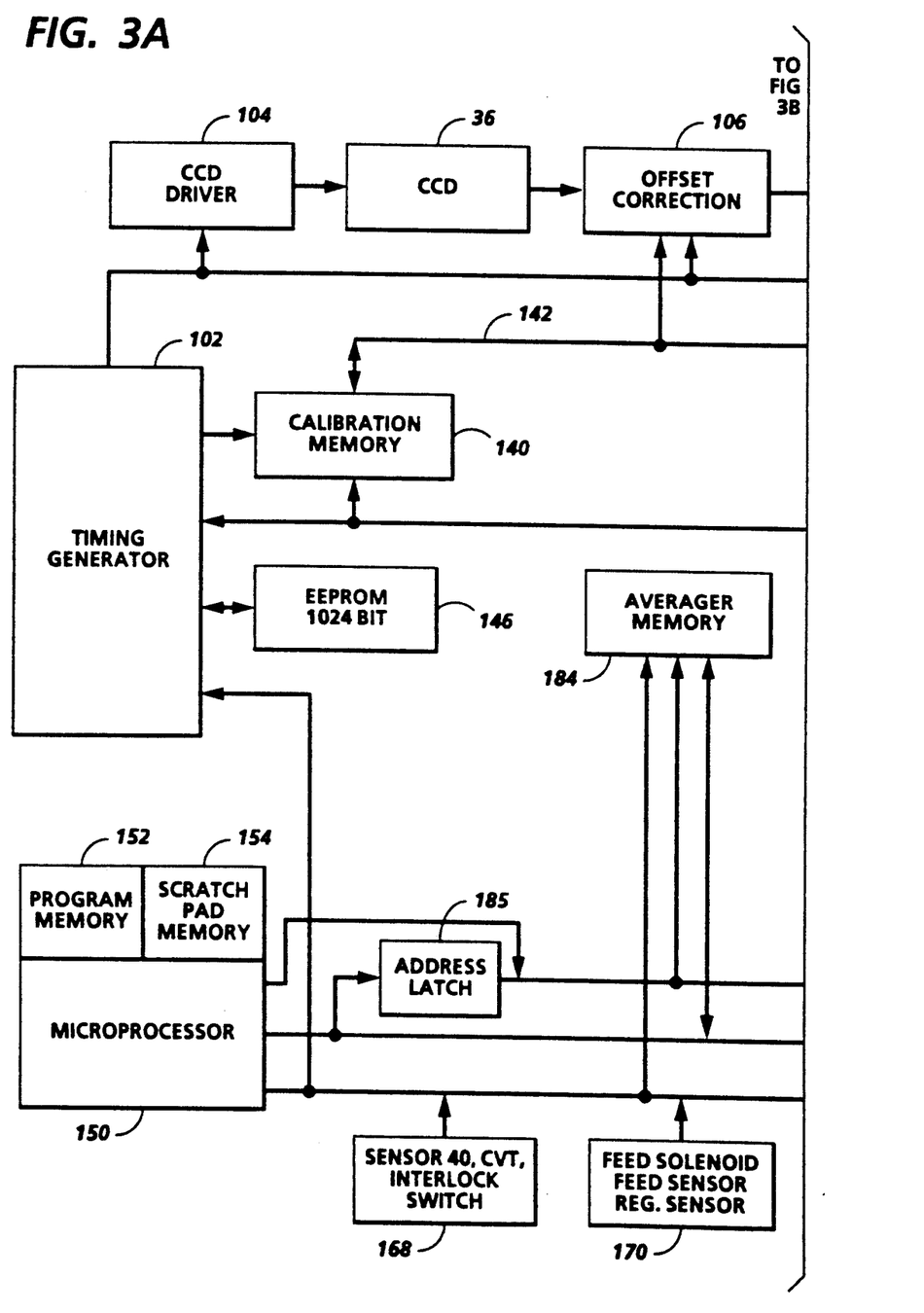
FIGS. 3A and 3B show an image processing arrangement in which the present invention may be implemented.
Figure 3B:
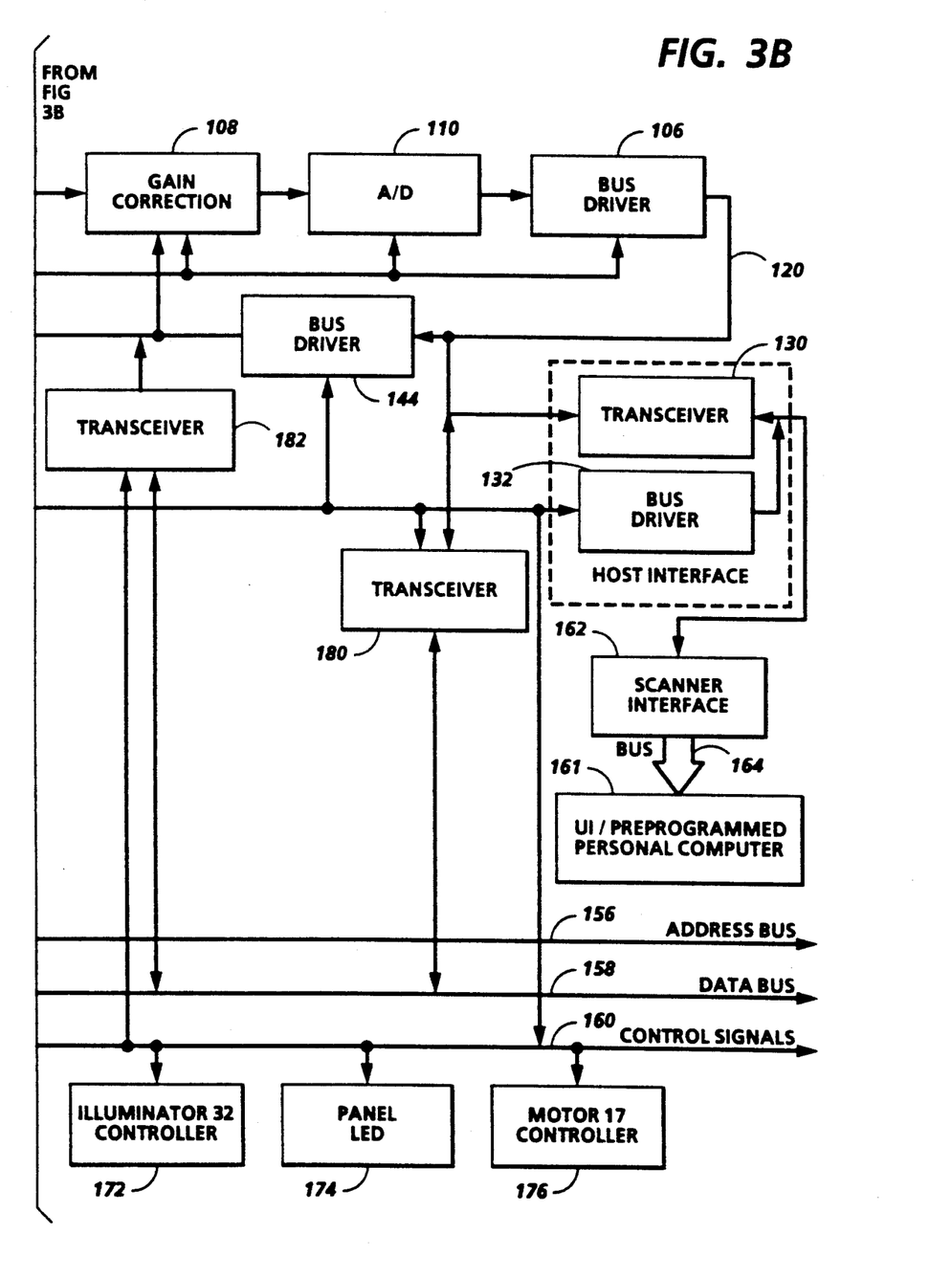

With reference now to FIGS. 3A and 3B, CCD array 36 is driven into an integrating condition periodically, in accordance with signals from a timing generator 102, and CCD driver 104. Analog values (small analog voltages) representing pixels or image data from each photosite are derived from CCD sensor array 36, and upon derivation, are directed to offset corrector 106 and gain corrector 108, as will be further explained hereinbelow. The analog pixel values are then converted to digital values at analog-to-digital (A/D) converter 110. Timing generator 102 provides pixel and scan line timing or sync signals to the CCD array 36, offset corrector 106, gain corrector 108, analog-to-digital converter 110. Digital image data is then directed onto a video data bus 120, controlled by video data bus driver 122, and eventually to output transceiver 130, where it is directed to other external devices in accordance with host interface bus driver 132 control. For certain purposes, including resolution conversion or scaling in accordance with the present invention, video image data may also be directed into the image processing system, via output transceiver 130, which is a bi-directional device.

Timing generator 102 also provides scan line and pixel timing signals to calibration memory 140, which in this particular case may be an 8K×3 static RAM memory device. Correction values are directed from calibration memory 140 in accordance with timing signals from timing generator 102 to correction bus 142 from which correction data is directed to offset corrector 106 and gain corrector 108. Accordingly, correction data corresponding to each photosite is delivered to the correctors for each pixel in sequence. Timing generator 102 may be a programmable gate array device, controlled in accordance with a EEPROM device 146. Alternatively, timing generator 102 may be a masked gate array device, which does not require an external program storage. Calibration or correction data is also directed into calibration memory 140 from correction data bus 142.

Microprocessor controller 150 includes program memory 152, which in this case is an 8K bit ROM device, and a scratch pad memory 154, in this case a 256K bit RAM device. Microprocessor controller 150 produces data on three main buses: an address bus 156, a data bus 158, and a control signal bus 160. Control signal bus 160 receives control signals from the sensor group 168, including start of scan sensor 40 and CVT interlock switch (not shown), to provide mechanical control of the CVT. Control signal bus 160 receives control signals from a feeder solenoid, feeder sensor, and a feeder registration switch, illustrated as a single block 170. Control signal bus 160 provides control signals for operation of a lamp controller 172 for control of the illuminator 32, operation of an LED panel 174, and for motor controller 176 controlling motor 17. Microprocessor controller 150 may also provide control of timing generator 102.

On data bus 158, data produced or required by microprocessor controller 150 may be directed to and from external devices, via transceiver 180, which is connected for bi-directional data transmission to and from video data bus 120 and transceiver 130, in accordance with timing and control signals from timing generator 102 and microprocessor controller 150 directed to transceiver 180. Control signal bus 160 directs control signals for control of, and data bus 158 carries data to and from, transceiver 182, for calibration procedures.

Address bus 156 directs address information concurrently with control signals from control signal bus 160 and data from data bus 158, to an averager memory 184. Address latch 185 is used to demultiplex the lower 8 address bits from data bus 158.

Figure 4A:
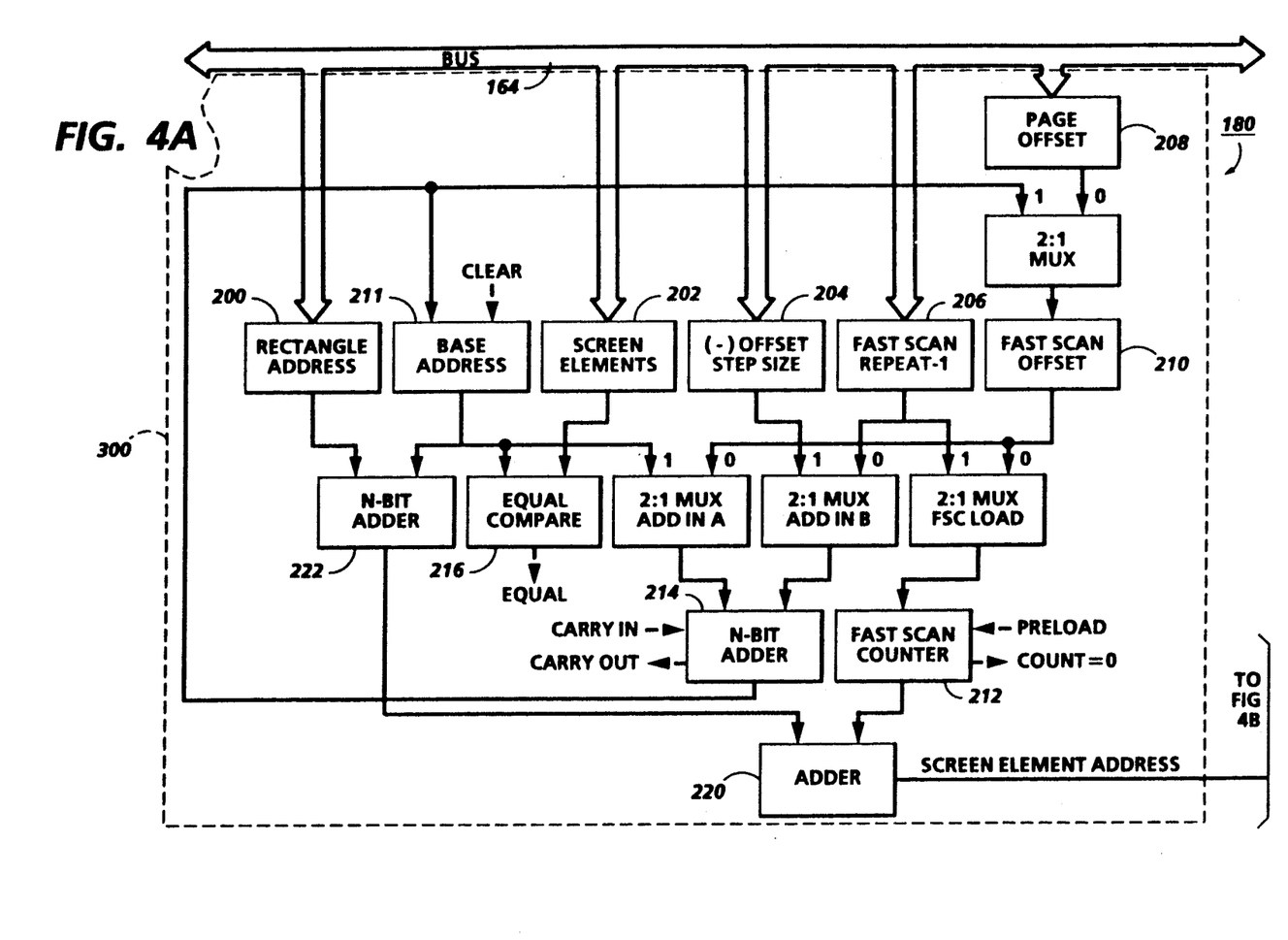
FIGS. 4A and 4B are schematic circuit diagrams of the screening circuit of the present invention.
Figure 4B:
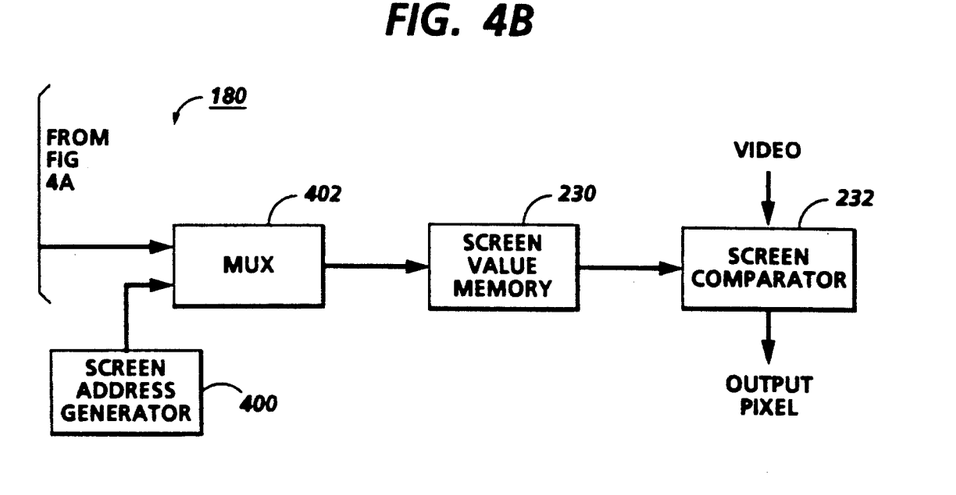

Referring to FIGS. 3A and 3B, for screening, the image pixels from A/D conversion means 36 are input to the screening circuit 180 in FIGS. 4A and 4B which may advantageously be located at an exterior device, such as an image processing board on a personal computer 161 with appropriate user interface (UI), connected via a scanner interface 162 which directs data to the image processing board via bus 164.

An angled halftone cell can be reproduced using an equivalent rectangular halftone cell with the introduction of a shift parameter. The size of the rectangular cell is specified by the Fast Scan Repeat parameter which is the width of a rectangular cell, and the Screen Elements parameter which is the product of the width and height of the rectangular cell. The Slow Scan Repeat parameter, or the height, of the cell can be computed from these two values. The shift parameter is referred to as the Offset Step Size. For multi-channel image processing architectures, an additional Page Offset parameter is used to initialize the starting fast scan offset within the rectangular cell so that parallel image processing channels implement the same screen without discontinuity. The circuit described hereinbelow generates addresses which are used to look up screen values from a linear array of memory (RAM). Since multiple screen rectangles can be co-located in the same linear memory array, a Rectangle Address parameter is used to store the starting location of the rectangle in the memory array.

Screen element address generation is broken into two pieces: 1) the sequencing of screen element addresses within a scan line and 2) calculation of the fast scan offset, or, the starting address at the beginning of a scan line. Address generation within a scan line must be performed at the video rate and is implemented using a counter. This implies that the screen element values for the width of the rectangle must be located sequentially within screen memory. For efficient hardware implementation of a wrap around or modulo counter, a down counter is used. When the count value reaches zero, the counter is sequentially reloaded with the fast scan repeat parameter minus one. This implements a count that is modulo fast scan repeat. Using a down counter requires that screen values loaded in the screen memory across the width of the rectangular cell be loaded in descending order. The calculation of the fast scan offset is only required between scan lines. To determine the new fast scan offset value, Holladay's algorithm states that for each row of the rectangular cell (of height slow scan repeat) use the same fast scan offset as in the preceding row. After the last row has been processed, the offset step size parameter is added to the fast scan offset modulo fast scan repeat to generate a new fast scan offset value. By assuming that each row of the rectangle is located sequentially within the linear memory array, and the fast scan counter is reloaded with the fast scan offset at the beginning of each line, this procedure can be implemented by the following "C" code program excerpt. Notice that the addition of the offset step size was change to a subtraction since the fast scan counter counts down.

```
BaseAddress + = FastScanRepeat;
if(BaseAddress = = ScreenElements)
{
    BaseAddress = 0;
    FastScanOffset - = OffsetStepSize;
    FastScanOffset% = FastScanRepeat;
}
```

Figure 6:
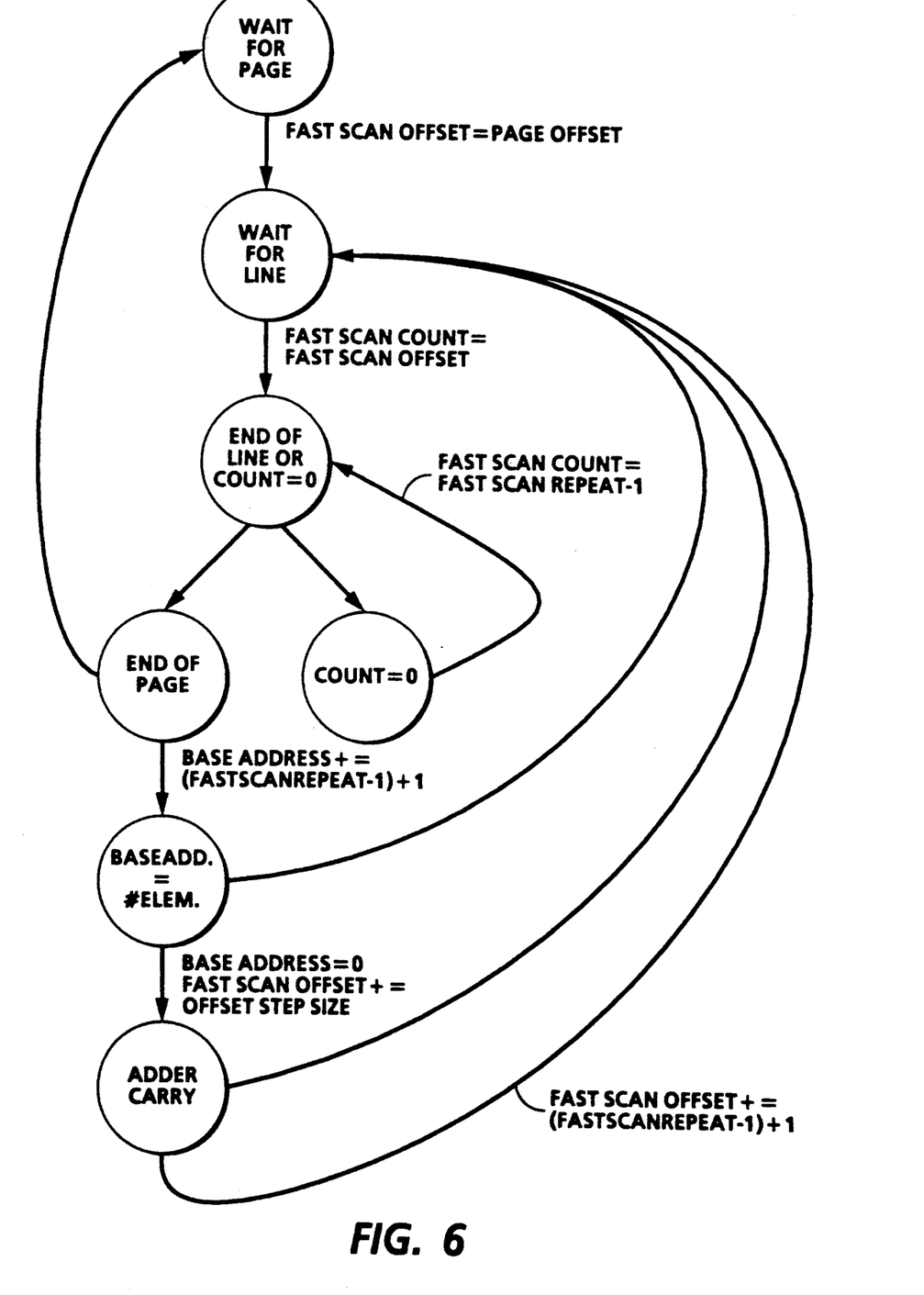
FIG. 6 is a state diagram of a finite state machine controlling value loading into the circuit of FIGS. 4A and 4B.

With reference now to FIGS. 4A and 4B, there is shown a block diagram of a circuit in accordance with the invention. A control arrangement may be implemented via a finite state machine whose state diagram is shown in FIG. 6, and which will be explained further hereinbelow. With reference again to FIGS. 4A and 4B, for a given screen, the registers are loaded with the following values:

Rectangle Address register 200: Address of the first row of screen value in the memory array. This register is used to select a set of screen values corresponding to a particular screen, when multiple sets of screen values are stored in a memory.

Screen Element register 202: Total number of screen elements for a particular screen (height times width).

(−) Offset Step Size register 204: Two's compliment of the Offset Step Size (shift parameter).

Fast Scan Repeat−1 register 206: Width, in pixels, of the rectangular halftone cell, minus one.

Page Offset register 208: Offset within the first row used for the first element in a page of image data.

At the beginning of a page of image data, as determined by a page synch signal from timing generator 102 (in FIG. 3A), fast scan offset register 210 is loaded with the value stored at page offset register 208, and base address register 211 is cleared or zeroed. At the beginning of each scan line, as determined by a scan line synch signal from timing generator 102 (in FIG. 3A), fast scan counter 212 is loaded with the value in the fast scan offset register 210. Throughout a scan line, whenever fast scan counter 212 reaches zero, it is reloaded with the value in the fast scan repeat−1 register 206. Since the fast scan repeat−1 register 206 is initially loaded with the fast scan repeat value, minus 1, reloading the counter with this value implements a count which is modulo fast scan repeat. At the end of each scan line, the fast scan offset register 210 is updated according to the "C" code excerpt listed below.

The first line of the "C" code is modified to add the value of (fast scan repeat −1)+1, since only the decremented fast scan repeat value is available. The addition of 1 is accomplished by controlling the input carry of adder 214. In the second line, a comparison of base address register 211 with screen elements register 202 is performed by equal comparator 216 to determine whether the screen has been completed (i.e., Base Address=Screen Elements). The output of comparator 216 is used by the finite state machine to control the hardware, to reset base address register 211 to zero. In the fifth line, the subtraction of the offset step size register 204 is replaced with an addition, since the value in (−) offset step size register 204 is the two's complement of the original shift parameter value. It can be shown that if no carry results from this addition, the fast scan offset value in register 210 will be a negative number. When the fast scan offset value is negative, the fast scan repeat value in register 206 is added thus implementing a (fast scan offset-offset step size) modulo fast scan repeat calculation.

```
BaseAddress + = (FastScanRepeat−1) + 1;
if(BaseAddress = = ScreenElements)
{
    BaseAddress = 0;
    FastScanOffset + = OffsetStepSize;
    if(!adder_carry)
        FastScanOffset + = (FastScanRepeat−1) + 1;
}
```

Thus, the output of adder 220, which represents the sum of fast scan counter 212 value, and the sum from adder 222 of the base address register 211 value and the rectangle register 200 value (where there are multiple screens to be addressed) is directed to screen value memory 230, and is the address of the screen value to to be applied to the corresponding pixel. Screen value memory 230 is addressed to provide an appropriate screen value for each pixel position to screen comparator 232, which compares each pixel in the video stream with a screen value to produce (usually, although not necessarily) an output binary pixel value.

Figure 5:
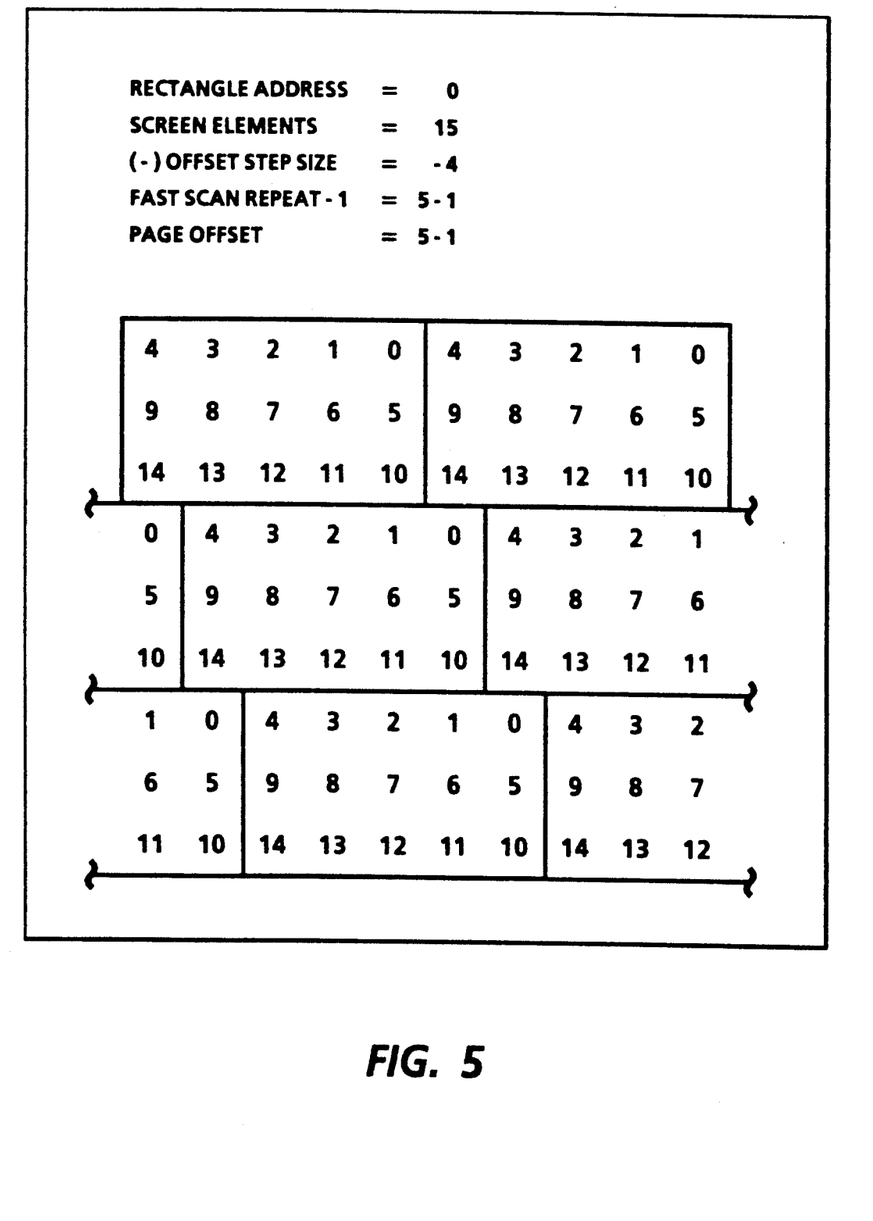
FIG. 5 is a sample screening sequence used to illustrate the operation of the circuit of FIGS. 4A and 4B.

To illustrate this procedure, consider the example of FIG. 5, with actual values bracketed, in view of the FIGS. 4A and 4B diagrams. At the beginning of the page, fast scan offset register 210 is loaded with the contents of page offset register 208 {in this case, 4} and base address register 211 is cleared or set to zero. For the first scan line, the sum of rectangle address register 200 {0} and base address register 208 {0} is zero. At the beginning of the first line, fast scan counter 212 is loaded with the contents of fast scan offset register 210 {4}. For each pixel, fast scan counter 212 decrements, until it reaches zero. It is then reloaded with the contents of fast scan repeat−1 register 206 {4}. Thus, the first line will produce addresses of {4,3,2,1,0,4,3,2,1,0, . . . }. At the end of this line, the contents of the fast scan repeat register 206 {4} plus 1 is added to the base address register 211 {0} for a result of 5. Since 5 is not equal to the number of screen elements, no change is made to fast scan offset register 210. For the second line, the sum of rectangle address register 200 {0} and base address register 211 {5} is now 5. At the beginning of the second line, fast scan counter 212 is loaded with the contents of fast scan offset register 210 {4}. For each pixel, fast scan counter 211 decrements until it reaches zero. It is then reloaded with the contents of fast scan repeat register 206 {4}. Thus the second line will produce addresses of {9,8,7,6,5,9,8,7,6,5, . . . }. At the end of this line, the contents of fast scan repeat register 206 {4} plus 1 is added to base address register 211 {5} for a result of 10. Since 10 is not equal to the number of screen elements, no change is made to fast scan offset register 210. For the third line, the sum of rectangle address register 200 {0} and base address register 211 {100} is now 10. At the beginning of the third line, fast scan counter 212 is loaded with the contents of fast scan offset register 210 {4}. For each pixel, fast scan counter 212 decrements until it reaches zero. It is then reloaded with the contents of fast scan repeat register 206 {4}. Thus the third line will produce addresses of {14,13,12,11,10,14,13,12,11,10, . . . }. At the end of the third line, the contents of fast scan repeat register 206 {4} plus 1 is added to the base address register 211 {10} for a result of 15. Since 15 is equal to the number of screen elements, base address register is cleared and the offset step size register {−4 or 252} is added to fast scan offset register 210 {4} for a result of 0. Since a carry output results from this addition, no further adjustment to fast scan offset register 210 is necessary. For the fourth line, the sum of rectangle address register 200 {0} and base address register 211 {0} is now 0. At the beginning of the fourth line, fast scan counter 211 is loaded with the contents of fast scan offset register 210 {0}. For each pixel fast scan counter 211 decrements until it reaches zero. It is then reloaded with the contents of fast scan repeat register 206 {4}. Thus the fourth line will produce addresses of {0,4,3,2,1,0,4,3,2,1, . . . }. The same procedure is repeated for the fifth and sixth lines. At the end of the sixth line, base address register 211 will be 10 and fast scan offset register 210 is still 0. When the contents of fast scan repeat register 206 {4} plus 1 is added to base address register 211 {5}, a result of 15 is obtained. Since 15 is equal to the number of screen elements, base address register 211 is cleared and offset step size register {−4 or 252} is added to fast scan offset register 210 {0} for a result of −4 or 252. Since no carry output results from this addition, fast scan repeat register 206 {4} plus 1 is added to fast scan offset register 210 {−4 or 252} for a result of 1. For the seventh line, the sum of rectangle address register 200 {0} and base address register 211 {0} is now 0. For each pixel fast scan counter 211 decrements until it reaches zero. It is then reloaded with the contents of fast scan repeat register 206 {4}. Thus the seventh line will produce addresses of {1,0,4,3,2,1,0,4,3,2, . . .}. At this point, all unique paths of the control sequence have been followed: 1) end of line where the base address register 211 is not equal to the number of screen elements; 2) end of line where the base address register 211 is equal to the number of screen elements and no adder carry output occurs, and; 3) end of line where the base address register 211 is equal to the number of screen elements and adder carry output occurs. Screen addresses for the remaining lines are generated using the described procedure.

In this example the width of all calculations was assumed to be 8 bits for a total possibility of 256 screen elements. The architecture can be scaled to any number of bits n to produce a maximum of 2 n possible screen elements.

With reference now to FIG. 6, the finite state machine representation is shown. As previously described, the output of comparator 216 is used by the finite state machine to control the circuit of FIGS. 4A and 4B.

With reference again to FIGS. 4A and 4B, multiple screen address generators, illustrated as screen address generator 300 and screen address generator 400, may be used to access the addresses in a single screen value memory 230 via multiplexer 402.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

I claim:

1. A screening arrangement for applying a variable angle halftone screen pattern to image data, including plural scan lines each having a plurality of pixels, including screen address generation means for generating addresses corresponding to a first set of screen values of the screen pattern stored in a memory, to be applied to the image data, said screen address generation means including:
   a page offset register loaded with the value representing the address in the screen of the first element in an image;
   a fast scan offset register, loaded initially for each image with the values stored at the page offset register, and thereafter at the end of each scan line with an offset value representing the amount of distance, in pixels, by which the start of the next scan line is offset from the previous scan line;
   a fast scan repeat register loaded with a value representing the width in pixels of the screen, minus 1;
   a base register, initially set to a reference value, and updated at the end of each scan line in accordance with the value in the fast scan repeat register, plus 1;
   a base address comparator, comparing said updated base register value compared with a value representing the number of pixel addresses in the screen pattern, to determine whether to reset the fast scan offset register to zero;
   a single fast scan counter, counting from a value loaded therein to zero, the value loaded therein at the beginning of a scan line value from the fast scan offset register, and the value loaded thereinafter from the fast scan repeat register;
   a fast scan counter adder, adding the values of the fast scan counter, and the values of the base address, to produce as an output the screen addresses for each repetition of the screen pattern.

2. The arrangement as described in claim 1, and including means for applying at least a second variable angle halftone screen pattern to image data, including screen address generation means for generating addresses corresponding to a second set of screen values of the second screen pattern stored in the memory, to be applied to the image data, including:
   a rectangle register, initially set to zero and which is updated with a new starting address value when the second screen is to be applied, the starting value added to the base address value prior to the addition thereof to the counter value.

3. A screening arrangement for applying a variable angle halftone screen pattern to image data, including screen address generation means for generating addresses corresponding to screen values of the screen pattern stored in a memory, to be applied to the image data, said screen address generation means including:
   a fast scan offset register, initialized for each image with a value stored indicating the start of an image, and thereafter at the end of each scan line with an offset value representing the amount of distance, in pixels, by which the start of the next scan line is offset from the previous scan line;
   a fast scan repeat register loaded with a value representative of the width in pixels of the screen;
   a base register, initially set to a reference value, and updated at the end of each scan line in accordance with the value in the fast scan repeat register;
   a base address comparator, comparing said updated base register value compared with a value representing the number of pixel addresses in the screen pattern, to determine whether to reset the fast scan offset register to zero;
   a single fast scan counter, making a count from a first value loaded therein at the beginning of a scan line value from the fast scan offset register to a second value, and the value loaded thereinafter from the fast scan repeat register;
   a fast scan counter adder, adding the values of the fast scan counter, and the values of the base address, to produce as an output the screen addresses for each repetition of the screen pattern.

* * * * *